Figure 1:
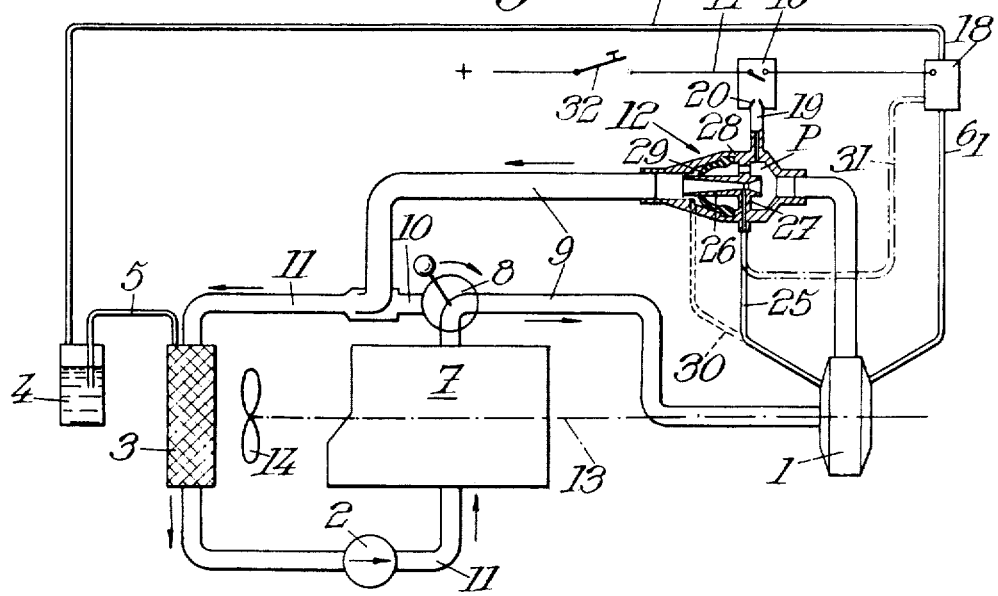

United States Patent
Bessiere

[11] B 3,924,713
[45] Dec. 9, 1975

[54] VEHICLE BRAKING DEVICES

[75] Inventor: Pierre Etienne Bessiere, Gold St.-Nom-la-Breteche, France

[73] Assignee: Labavia-S.G.E., Paris, France

[22] Filed: May 10, 1973

[21] Appl. No.: 358,939

[44] Published under the Trial Voluntary Protest Program on January 28, 1975 as document no. B 358,939.

[30] Foreign Application Priority Data

May 26, 1972 France .......................... 72.19058

[52] U.S. Cl. .................... 188/296; 60/378; 60/453; 192/3 TR
[51] Int. Cl.² ......................................... F16D 57/02
[58] Field of Search ...... 188/290, 296; 60/336, 378, 60/453; 192/3 R, 3 TR

[56] References Cited
UNITED STATES PATENTS

| | | | |
|---|---|---|---|
| 2,363,821 | 11/1944 | Webster | 188/290 |
| 2,750,009 | 6/1956 | Polil | 188/296 |
| 2,786,552 | 3/1957 | DeLaMater et al. | 188/296 |
| 3,024,876 | 3/1962 | Montgomery | 188/296 |
| 3,512,616 | 5/1970 | Bessiere | 188/296 |
| 3,650,358 | 3/1972 | Bessiere | 188/296 |

FOREIGN PATENTS OR APPLICATIONS

| | | | |
|---|---|---|---|
| 220,497 | 8/1957 | Australia | 188/296 |
| 537,867 | 10/1931 | Germany | 188/296 |

*Primary Examiner*—Trygve M. Blix
*Assistant Examiner*—Edward R. Kazenske
*Attorney, Agent, or Firm*—Stevens, Davis, Miller & Mosher

[57] ABSTRACT

A hydraulic brake supplied by water which circulates successively through a pump and a radiator forming an expansion vessel, and a purging pipe being provided between the center of the brake and the top of said vessel. A control device responsive to the pressure existing at a point in the water system and situated downstream of the brake. The device controls a value which automatically closes the purging pipe during the working phases of the brake and opens the pipe on the placing in and out of service of the brake. The brake is particularly advantageous for rapid passenger vehicles.

11 Claims, 3 Drawing Figures

VEHICLE BRAKING DEVICES

The invention relates to vehicle braking devices comprising a hydraulic retarder capable of being supplied during its working phases, by a liquid flowing in a closed circuit through a succession of members of which one constitutes an expansion vessel or is connected to such a vessel.

It relates more particularly, among these braking devices, to those which comprise a pipe connecting the heart of the brake to the top of the expansion vessel, which pipe is called "purging pipe" hereafter.

Such a purging pipe is advantageous in that it enables acceleration both of the placing in service of the brake as well as its placing out of service, that is to say of accelerating equally well the filling of the brake with liquid on its placing in service, then serving as a pipe for the removal of the air contained in the center of the brake, as well as the evacuation of the liquid from the brake on its placing out of service, thereby serving as air intake pipe in the brake.

Applicant has discovered that, without spoiling in any way these very valuable accelerations of the phases of establishing and eliminating the braking torque, closing of said pipe between these two phases, that is to say during the period of working of the brake, is particularly advantageous in that it enables the value of said torque to be increased and this to a very substantial proportion easily reaching 30%.

The braking devices of the type concerned according to the invention are hence characterised in that they comprise means for closing the purging pipe when the brake is in service.

In preferred embodiments, recourse is had in addition to one and/or other of the following features:

the closing means of the purging pipe are actuated automatically as a function of the activation and of the deactivation of the brake, in a braking device according to the preceding paragraph, the automatic closing means of the purging pipe are sensitive to the pressure of the liquid emerging from the brake and are arranged so as to close said purging pipe when this pressure exceeds a predetermined threshold, in a braking device according to the preceding paragraph, the value of the threshold pressure is substantially equal to the maximum value capable of being obtained for this pressure as long as the purging pipe remains open, the means sensitive to pressure comprise an electric manostat adapted to actuate an electrovalve mounted in the purging pipe, the pressure of the liquid is applied to the means sensitive to this pressure through a diaphragm adapted to create a time delay effect all the greater as said pressure is higher, automatic closing means for the purging pipe comprise time delay means to delay by a predetermined time the actuatuion of the closure from the beginning of the activation of the brake, a second purging pipe is mounted between the heart of the brake and the throat of at least one venturi arranged downstream of the brake in the closed circuit of the liquid, in a braking device according to the preceding paragraph, the upstream sections, of the two purging pipes, starting from the heart of the brake are merged, in a braking device according to the preceding paragraph, the closing means of the first purging pipe comprise a three-way two-position tap mounted at the downstream end of the upstream section common to the two purging pipes, which tap is mounted so as to permute the downstream sections of these two pipes.

The invention comprises, apart from these principal features, certain other features which are preferably used at the same time and which will be more explicitly considered below.

In the following, there are discribed preferred embodiments of the invention with reference to the accompanying drawing, in a manner of course not to be considered as limiting.

FIG. 1 of this drawing is the diagram of a braking device for a vehicle, constructed according to the invention.

Figure 2:
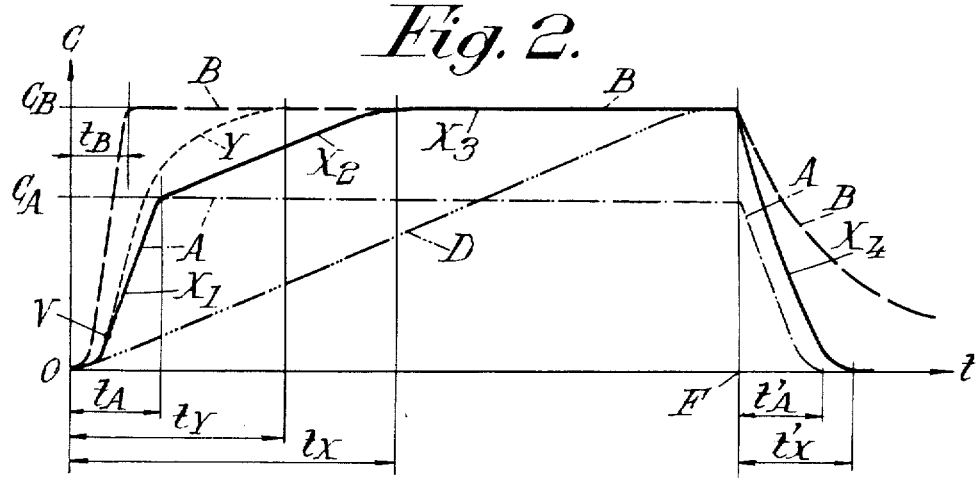

FIG. 2 is a graph enabling the operation of this device to be understood.

Figure 3:
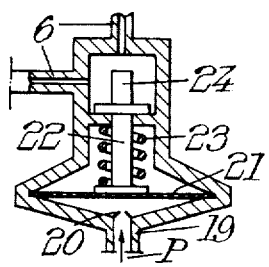

And FIG. 3 shows in axial section a modification of a pressure sensitive valve which exists at a suitable point of the device concerned.

In manner known in itself, the braking device of the vehicle comprises a hydraulic brake 1 supplied by liquid which flows successively in closed circuit through the drive pump 2 and the radiator 3 of the vehicle, which radiator constitutes an expansion vessel for the system or is itself connected to such an expansion vessel 4 by a pipe 5.

The inner gaseous volume at the vortex (the center) created by the movement of the liquid in the brake on its operation is connected by a pipe 6 to the top of the expansion vessel (3 or 4).

In addition, and although this is not indispensable, the closed circuit of liquid passes through, in addition to the members 1, 2 and 3 above: the engine 7 of the vehicle; a valve 8 with three ways and two positions enabling the brake and a loop 9 of the closed circuit concerned to be mounted in parallel on a section 10 of the normal cooling circuit 11 of the vehicle and thus to send the whole of the flow of cooling water of this vehicle either into this section 10, or into the brake; and, downstream of said brake, a throttle 12 whose passage crosssection is automatically rendered all the greater as the pressure of liquid emerging from the brake is itself higher, the engine 7 is intended to equip a fast passenger vehicle, and the rotor of the brake is mounted on the shaft 13 of this engine, which shaft drives the cooling fan 14 of the radiator 3.

It is the pipe 6 — which will sometimes be called "purging pipe" in the following — that it is proposed to close, according to the invention, during the working phases of the brake, that is to say from the moment when a substantial portion of the braking torque is developed and until the beginning of the subsequent deactivation of the brake.

It will be recalled that the presence of this pipe 6 accelerates the establishment and the elimination of the braking torque by serving alternately as evacuation pipe for air on the filling of said brake with liquid and intake pipe for this air on the emptying of the brake of liquid.

However by means of this pipe the pressure of the air existing in the expansion vessel remains trapped at the center of the vortex, which in practice prevents complete filling of the brake with water. As a result there is a limitation in the maximum value obtainable for the braking torque and an increase in the time for the establishment of maximum torque.

In the graph of FIG. 2, where there have been shown as ordinates the braking torques and as abscissae the time, the curve A represents the variations as a function of time of the torque generated by the brake if the pipe 6 is maintained open.

For the establishment of this graph, it is assumed that the shaft 13 on which the rotor of the brake is mounted remains driven at constant speed, even after the application of the decelerating torque to it (case of mounting on a test bank or descent of a long slope by the vehicle): so this graph does not correspond exactly to reality, seeing that in the most general case, the application of the decelerating torque to the vehicle is manifested by a reduction in the speed of the rotor and hence by reduction in the efficiency of the brake by reason of its hydraulic nature.

The origin O of the coordinates corresponds to the beginning of the filling of the brake with water, that is to say at the moment of the actuation of the valve 8 in the preferred example illustrated, and the maximum value $C_A$ of the deceleration torque is obtained after a time $t_A$ beyond which the deceleration torque remains constant, in the hypothesis envisaged (and with the pipe 6 open).

The moment represented by the letter F in FIG. 2 corresponds to the end of the working of the brake, or more precisely to the beginning of the emptying phase of this brake, which phase is triggered by the return of the valve 8 to its initial position in the example illustrated.

Starting from this moment F the decelerating torque is entirely annulled at the end of a time $t'_A$.

The curve B represents the variation in the deceleration torque generated by the brake as a function of time if the pipe 6 is kept permanently closed, by assuming that the brake has been rendered initially empty both of air and of water by the application of a suitable suction.

It is seen that there is obtained in time $t_B$ very much less than $t_A$ (of the order of 30%) a maximum braking torque $C_B$ very much greater than $C_A$ (by about 30%).

But such permanent closing can not be envisaged as the emptying of the brake of water, being then effected only by the conjugated pumping force of the braking rotor 1 working as a pump and of the pump 2 without the introduction of outer air, is too slow and is manifested by a "torque drag" which is very bothersome (see the section of the line of the curve B in FIG. 2).

It can no more be envisaged to close the pipe 6 on the filling of the brake with water and to open it on its emptying, since after an emptying effected with the pipe 6 open, the brake is filled with air and the subsequent closing of this pipe 6 for the consecutive filling with water renders this filling prohibitively slow, the curve for the establishment of the torque then being that represented at D in FIG. 2.

The solution provided by the invention combines in practice the advantages of the various solutions mentioned above without having their drawbacks.

According to this solution, the brake being full of air at rest, which condition is necessary to ensure the minimum torque outside of service, its filling with water is commenced although the pipe 6 is open, which removes rapidly through this pipe towards the expansion vessel the greater part of the air contained in the brake: this phase of starting or placing in service corresponds to the section of the curve $X_1$ merged with the section on the left of curve A.

Then, when the torque $C_A$ is reached, the pipe 6 is closed: the maximum torque $C_B$ is then reached according to a section of curve $X_2$ substantially parallel to curve D.

This second phase could of course be commenced before the torque has reached the value $C_A$, but it is more advantageous to reach this value $C_A$ first to reduce as much as possible the total response time $t_X$ corresponding to filling.

Starting from the end of time $t_X$, the maximum torque $C_B$ remains established until the final instant F (section of curve $X_3$, merged with curve B).

From the cut-off of the supply of the brake at the moment F, the pipe 6 is again opened: the emptying of the brake of water is then very rapidly effected, along a section of curve $X_4$ substantially parallel to the corresponding section of the curve A.

As stated above, this compromise formula brings together in practice the advantages of the two formulae corresponding respectively to the permanent opening and the permanent closing of the pipe 6 since:

on one hand the maximum braking torque is increased to a very considerable proportion, for example of the order of 30%, on the other hand the time of establishing the torque up to the value $C_A$ of the latter is not greater than $t_A$, only the excess growth of the torque developed then ($C_B - C_A$) being established at a relatively low speed, finally the time of emptying $t'_X$ is of the same order of magnitude as the time $t'_A$ above and is not manifested by any troublesome "torque drag."

The closing of the pipe 6 is preferably actuated automatically during the working of the brake by servocoupling this closing to this working.

There can be provided for this purpose a time delay control thereby automatically ensuring said closing after a delay ($t_A$) fixed in advance, for example of the order of a second, starting from the actuation of the valve 8 towards its "braking" position, the reopening of the pipe 6 then being servocoupled to the actuation of the valve 8 to its "resting" position.

This time delay and this servocoupling can be ensured mechanically or electrically.

According to an advantageous modification, they are ensured by the suction which exists in the intake pipe of the gases to the engine, downstream of the gas throttle valve, when the accelerator is released, if the actuation of the brake is itself servocoupled to such a release of the pedal, said time delay being then obtainable very simply by applying said suction to the control system for closing the pipe 6 not directly, but through a correctly calibrated diaphragm.

In the preferred embodiments, the closure concerned of the pipe 6 is servocoupled to the pressure of the water emerging from the brake: as soon as this pressure exceeds a predetermined threshold, corresponding to the development of torque $C_A$ in the above example, the pipe 6 is closed and conversely it is reopened when this pressure again drops below this threshold.

To this end there is advantageously used a manostat 16 or electric switch sensitive to the water pressure which exists at a point P, of the circuit of this water, arranged just upstream of the throttle 12: this switch is mounted in the electric supply circuit 17 of an electrovalve 18 itself mounted in the pipe 6.

On pipe 19 connecting the point P to the manostat 16, there is preferably mounted a diaphragm 20 with calibrated opening of which the role is to prevent the immediate application of the pressure which exists at point P to the manostat 16, this application being done with a speed which takes into account the rate of establishing the said pressure.

In this way the manostat operates practically with a constant time response whatever the speed of the engine shaft 13.

There are thus avoided the drawbacks which would be due to direct servocoupling of the manostat to the water pressure point P and which can be illustrated by the following numerical example: it is assumed that, when the shaft 13 rotates at a relatively low speed $V_1$, the water pressure corresponding to the maximum torque $C_A$ for the open state of the purging pipe is of the order of 1 bar, whilst it would be of the order of 5 bars for the same open state of the purging pipe with a high speed $V_2$ of said shaft 13; if under these conditions the calibration pressure of the manostat 16 is fixed at a value slightly less than 1 bar (0.9 bar) to render possible a passage to the closed state of the purging pipe when the speed of the shaft is as low as $V_1$, this calibration causes, in the case of direct control of the manostat 16 and with a speed of the engine shaft of the order of $V_2$, the closing of said purging pipe in a zone of the curve of the establishment of the torque very distant from its maximum value $C_A$, so that the time of establishment $t_X$ of the maximum torque is substantially increased.

So that the delay in activation of the manostat may not be maintained for its deactivation, it may be advantageous to give the diaphragm 20 a frustoconic shape convergent in the direction of the manostat.

In the modification illustrated in FIG. 3, the pressure at the point P acts on a membrane 21 controlling, through a needle 22 constantly urged by a spring 23 towards its resting position (illustrated in the Figure), the movement of a valve 24 adapted to control the opening and closing of the purging pipe 6.

For the reason expressed above, the said pressure is not applied immediately to said membrane 21, but as previously through a calibrated diaphragm 20, preferably convergent in the direction of this membrane.

To further improve the curve of the rise in torque, according to another advantageous feature of the invention, a suction effect is exerted on the gaseous volume contained in the vortex of the brake by connecting the latter, through a pipe 25, to the throat of a venturi mounted in the circuit of the liquid itself, at a point of this circuit located downstream of the brake, between the latter and the radiator.

This feature has the effect of accelerating the filling of the brake with water.

The braking torque is then established according to curve Y situated between the curve B and the sections of the curve $X_1$ and $X_2$, said curve Y being detached from the section $X_1$ from a point V corresponding to the moment when the venturi is traversed by a sufficient flowrate of water.

As a result finally there is a reduction in the time ($t_Y$) of the establishment of the torque $C_B$.

In addition the construction proposed to create the effect of suction has the enormous advantage of not causing a loss of water since the whole of the water aspirated by the venturi, whether it is in liquid phase or in vapor phase, is always returned to the closed circuit of the water.

In the preferred embodiments the throttle means 12 includes a convergent-divergent venturi tube 26 mounted at the center of a perforated rigid disc 27 and held by this disc in the axis of an elongated chamber 28 flared at its center, the section of opening of the annular passage reserved between the outer wall of this tube and the inner wall of this chamber being adjusted automatically by the deformations of an elastic diaphragm 29.

It is at the throat of said tube 26 that the downstream end of the pipe 25 ends.

In addition, to increase further the effect of suction produced, in the illustrated embodiment, there is also connected to the vortex of the brake, through another pipe shown in interrupted lines 30, a zone, of the venturi, situated just downstream of the movable lip of the diaphragm 29, in which zone there also exists slight suction.

In a modification, instead of connecting the vortex of the brake constantly to the throat of the venturi 26, this connection is only ensured when the pipe 6 is closed, and this through the upstream section $6_1$ of this pipe 6 itself: the pipe 25 is then replaced by a pipe 31 (shown in mixed lines in FIG. 1) connecting the valve 18 to the throat of the venturi, this valve then being a three-way valve capable of ensuring at will the connection between the upstream section $6_1$ and either said pipe 31, or the downstream section of the pipe 6.

Such a construction avoids dividing the purging pipes which end at the vortex of the brake.

Such division can besides be also avoided in the preceding embodiment by merging the upstream sections of the two pipes 6 and 25.

As a result of which, and whatever the embodiment adopted, there is finally obtained a braking device for a vehicle which is particularly efficient.

It should be noted that, in practical applications, the decelerating torque is limited to a maximum value $C_A$ by the construction itself of the clutch of the vehicle, which must transmit this torque of the engine to the wheels: the gain obtained by the invention at high speeds is then not truly an increase of the maximum torque obtained initially, but, what comes over all to the same thing, a prolonged maintenance of this maximum value or at least a value closer to this maximum than previously, and this in spite of the reduction in speed of the vehicle which is caused precisely by the application of the braking torque to the vehicle.

As is self-evident, and as emerges already from the foregoing, the invention is in no way limited to those of its types of application and embodiments which have been more especially envisaged; it encompasses, on the contrary, all modifications, especially those where means easy to actuate by the driver of the vehicle (such as an electric switch 32 mounted in the electric supply circuit 17) would be provided to neutralize the automatic actuation of the closing of the purging pipe.

I claim:

1. Hydraulic vehicle braking apparatus, comprising a housing;
a closed fluid system for supplying fluid to, and emptying fluid from said housing, said system including an expansion vessel (3);
a first purging pipe (6) connecting the center portion of said housing with the top of said expansion vessel, whereby the inner gaseous volume at the center of said housing is conducted to the top of the vessel;

valve means (18) connected in said purging pipe, said valve means being operable between open and closed conditions to afford and to interrupt communication, respectively, between said housing and said expansion vessel; and means responsive to the pressure of the fluid emptying from said housing in said system for controlling the operation of said valve means to cause said valve means to be in the open condition for a given time delay period ($t_4$) during the initial filling of the housing and to be in the closed condition during the remainder of the filling period, said control means being operable to cause said valve means to be in the open condition during the entire period of emptying of fluid ($t'_r$) from said housing.

2. Apparatus as defined in claim 1, wherein said housing houses a brake means and said valve control means is automatically operable as a function of the activation and de-activation of said brake means.

3. Apparatus as defined in claim 2, wherein said valve control means responsive to the pressure of the fluid emptying from said housing is operable to cause said valve means to close said purging pipe when the brake fluid pressure exceeds a predetermined threshold value.

4. Braking apparatus according to claim 3, wherein the valve means is an electrovalve and the pressure responsive means includes an electric manostat adapted to control said electrovalve.

5. Braking apparatus according to claim 3, wherein the pressure responsive means includes a diaphragm through which the pressure of the liquid is applied, said diaphragm is adapted to exert a time delay effect proportional to said pressure.

6. Braking apparatus according to claim 5, wherein the diaphragm has a convergent shape in the direction of the means sensitive to the pressure of the liquid.

7. Apparatus as defined in claim 1, wherein said control means includes venturi means (26) connected downstream of said housing, said venturi means including a throat portion; and further including a second purging pipe (25) connected between said housing and the throat portion of said venturi means, whereby a suction effect is exerted by said venturi means on the gaseous volume appearing at the vortex of the hydraulic fluid in said housing.

8. Apparatus as defined in claim 7, wherein said venturi means includes a venturi tube (26) arranged in spaced relation in a housing; and further including a diaphragm (29) arranged concentrically between said venturi tube and said housing to define a second venturi throat, and third conduit means (30) connecting said second venturi throat with the central portion of said housing.

9. Apparatus as defined in claim 7, wherein said second purging pipe (31) communicates with the central portion of said housing via a portion of said first purging pipe.

10. Apparatus as defined in claim 9, wherein said valve means comprises a three-way two-position valve having a pair of outlets connected with said expansion vessel and with said venturi means, respectively, and an inlet connected with the central portion of the housing, whereby said housing is alternately connected with said expansion vessel and with said venturi means, respectively.

11. Apparatus as defined in claim 1, and further including means operable by an operator of the vehicle for neutralizing the automatic closing control of the purging pipe.

* * * * *